Dec. 16, 1947.  C. R. WASEIGE  2,432,550

SCREW PROPELLER PITCH ADJUSTING DEVICE

Filed March 27, 1941  2 Sheets-Sheet 2

INVENTOR,
C. R. Waseige
BY
Glascock Downing & Seebold
ATTORNEYS

Patented Dec. 16, 1947

2,432,550

UNITED STATES PATENT OFFICE 2,432,550

SCREW PROPELLER PITCH ADJUSTING DEVICE

Charles Raymond Waseige, Rueil, Seine-et-Oise, France; vested in the Attorney General of the United States Application March 27, 1941, Serial No. 385,563
In France April 6, 1940

1 Claim. (Cl. 170—163)

This invention relates to adjustable pitch screw propellers usable on land, sea or air vehicles, or even on stands for testing engines or the like, and more particu'arly to a device for adjusting the pitch of rotating screw propellers having any number of blades, the arrangements that embody such a device being of course included in the scope of this invention.

More specifically, the screw propeller pitch adjusting device is of the kind comprising, on the one hand, a driving mechanism housed in a stationary casing and driving a member, such as a gear wheel or the like, coaxial with the propeller shaft and, on the other hand, driving connections between said coaxial member and the different blades for controlling the angular setting of each blade about its axis in a manner which is dependent upon the rotation of said coaxial member relative to the propeller shaft.

The mechanisms of this kind as heretofore known comprise clutches or similar devices allowing of connecting same, at will, with the screw propeller shaft which itself serves as a power source for the control of pitch adjusting, resulting in rather intricate arrangements.

On the other hand, there has already been proposed a blade pitch indicator comprising a differential gear, the two sun wheels of which are respectively connected with the propeller shaft and the aforesaid member, coaxial with this shaft, and the planet pinion of which is carried by a support or casing the angular setting of which, relatively to the common axis of the sun wheels, is determined in any suitable manner, thus allowing to read the pitch of the screw propeller upon which said angular setting is dependent.

The present invention consists, inter alia, in applying a device of the aforesaid type, used as a propeller pitch indicator, for controlling the adjusting of said pitch and in providing said device, for that purpose, with a driving shaft arranged so as to control the rotation of the support or casing of said planet pinion in either direction and which may, for example, be handoperated, by an electric motor rotating in both directions, or the like.

There is thus obtained a simplified arrangement of reduced weight and bulk, well suitable for numerous uses.

In the arrangement thus constructed, every rotation or partial rotation of the aforesaid driving shaft corresponds to a well defined alteration of the angular position of the blade, so that it is possible, in accordance with ano'her feature of this invention, to conjugate said driving shaft with a pitch indicator comprising, for example, a pointer operated by said shaft through the medium of a reducing transmission gear.

According to a preferred embodiment, the device comprises a differential gear the planet pinion of which is carried by a casing connected with a crown wheel engaging with a driving pinion attached to a driving shaft connected by a reducing gear to a pitch indicator, while the sun wheels of said differential gear are connected with the driving shaft and the coaxial member by transmissions having the same gear ratio, of which transmissions one comprises an additional idler pinion for reversing the direction of the rotation in order to prevent the rotation of the coaxial member relatively to the driving shaft when the differential casing is not in motion.

Another feature of this invention—which is a highly desirable improvement usable independently from that described above. though it will be advantageously used in combination therewith, consists in arranging forwardly of the propeller hub, the greater part of the transmission members that cannot be placed inside said housing, so as to reduce the overhang to a minimum value in placing the centre of gravity of the propeller as near as possible to the bearing that supports the hub of the shaft.

In accordance with the invention, the transmission between each of the blades of the propeller and the aforesaid control member, which is coaxial with the propeller shaft and carries a toothed wheel, comprises a gear secured to a secondary shaft supported parallelly to the axis of said propeller shaft in the hub of the propeller and extending throughout said hub, said gear engaging with the aforesaid toothed wheel, and a gear secured to said secondary shaft forwardly of the propeller and directly connected to a transmission carried by the hub and in engagement with the corresponding blade.

Each of the blades of the propeller are connected by similar transmissions with the aforesaid coaxial member.

Other features and advantages of this invention will be apparent from the following description of an embodiment shown merely as an example in the accompanying drawings in which:

Fig. 4 shows a modification of a detail.

Figure 1:
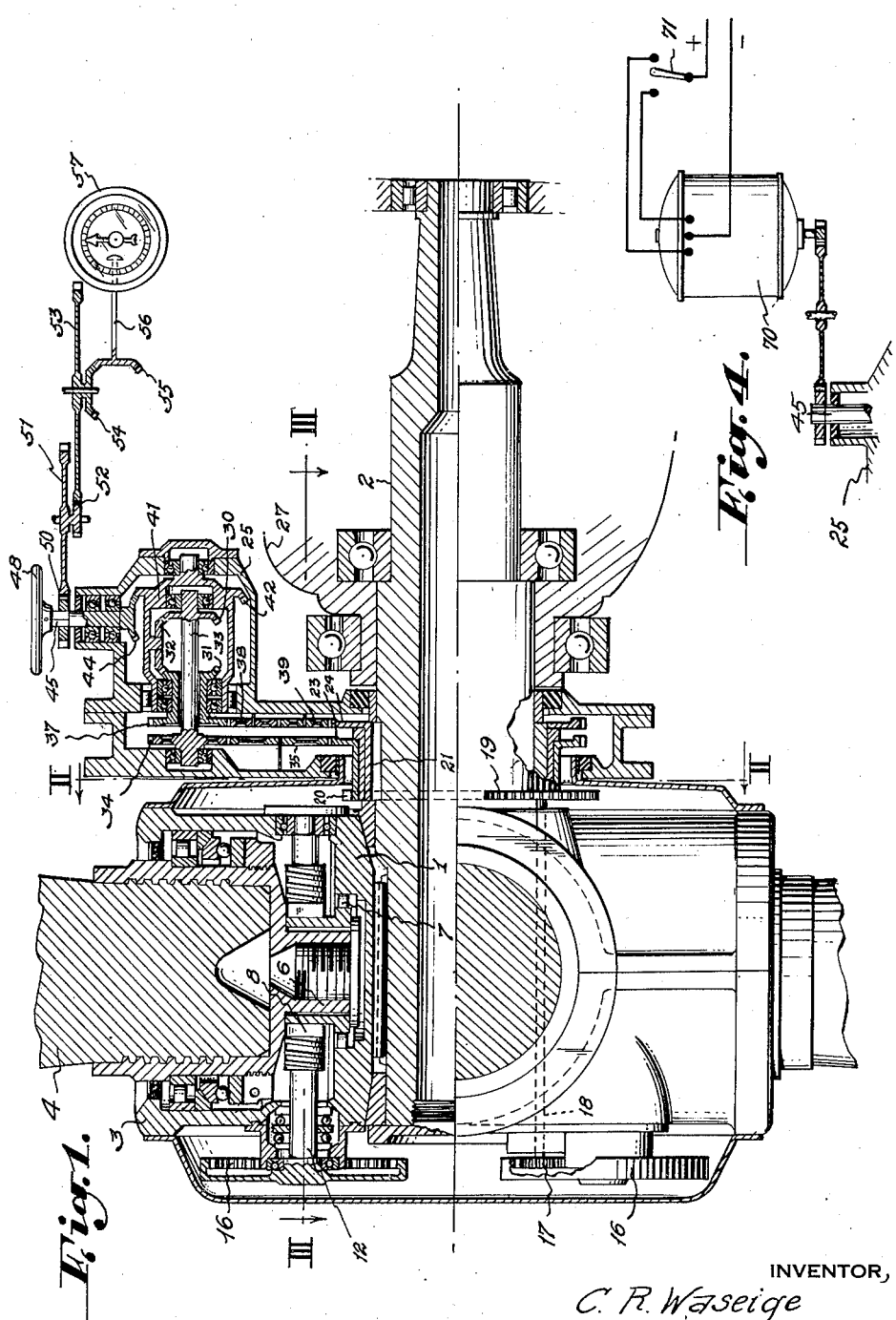
Fig. 1 is a sectional elevation on the line I—I of Fig. 2, showing a propeller according to the invention.
Figure 2:
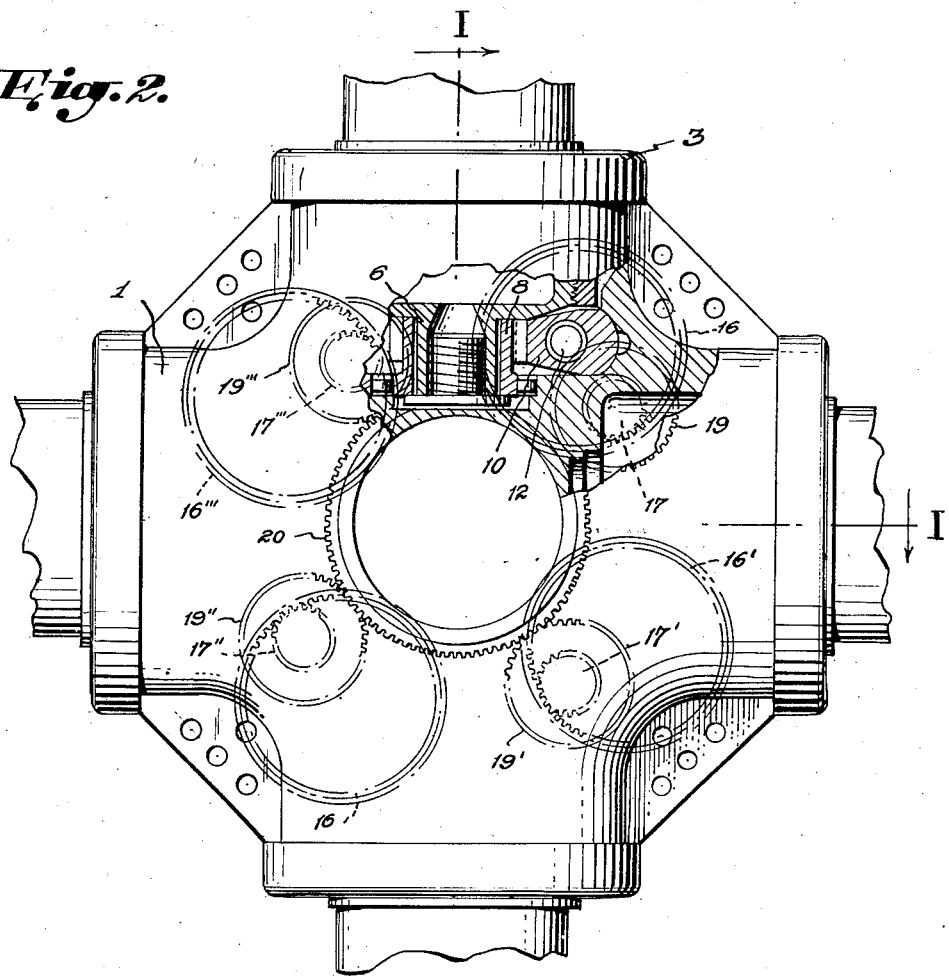
Fig. 2 is a corresponding end view of said propeller.
Figure 3:
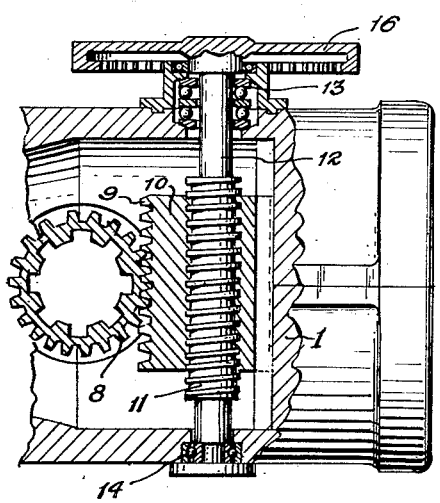
Fig. 3 is a fragmental section on the line III—III of Fig. 1.

According to the embodiment shown, relating to a four-blade screw propeller, the hub 1 of said propeller, attached to the end of the propeller shaft 2, is reduced in length substantially to the diameter of the sockets 3 of the roots 4 of the blades. Each blade root 4 is provided on its base with a spindle extension 6 mounted by means of a roller bearing 7 in the hub 1. To this spindle 6 there is secured a gear wheel 8 (Fig. 3), in engagement with a rack 9 provided on a screw nut 10 which coacts with a screwthread 11 formed on a secondary shaft 12. The shaft 12 is mounted parallelly to the propeller shaft 2 in antifriction bearings 13 and 14 carried by the hub 1 and projects forwardly of the latter, i. e. on the side remote from the engine. To the projecting end of said shaft 12 is secured a crown wheel 16 having an inner set of teeth of large diameter with which engages a small pinion 17 attached to a secondary shaft 18, carried by and extending throughout the hub 1. The secondary shaft 18 carries at its rear end a gear wheel 19, in engagement with a set of teeth 20 provided on a driving sleeve 21 that is loosely mounted on the propeller shaft 2.

In the example shown, three other gearings are provided which are exactly similar to the gearing just described and bear in the drawings the same numbers of reference but with the differentiating signs ', '' and ''' affixed, the four gearings thus ending respectively with four gear wheels, 19, 19', 19'' and 19''', engaging with the set of teeth 20 of sleeve 21.

The sleeve 21 is provided with another set of teeth 23 adjacent to which there is coaxially secured to shaft 2 a gear wheel 24 having substantially the same diameter as the set of teeth 23, both sets of teeth being arranged opposite the end of a fixed casing 25 secured to the end of the frame 27 supporting the propeller shaft 2, said casing housing the mechanism for controlling the adjustment of the blade pitch.

This mechanism comprises substantially a differential gear consisting of two coaxial sun wheels 30 and 31 and a planet pinion 32. The sun wheel 30 is attached to a shaft 33 to the end of which there is secured a gear wheel 34. Supported by the casing 25 there is a pinion 35 engaging with both gear wheels 34, 23. The sun wheel 31 is integral with a sleeve mounted on shaft 33 and carrying a gear wheel 37. Two pinions 38, 39 supported by the casing 25 are in engagement with each other and are also respectively in engagement with gear wheels 37 and 24. The whole device is arranged so that the wheels 23 and 24 rotate at the same speed and in the same direction when the sun wheels 30 and 31 rotate at the same speed but in opposite directions, i. e. when the planet pinion 32 is stationary. This planet pinion 32 is loose on a stub shaft carried by a casing 41 mounted on antifriction bearings provided in the casing 25 coaxially with shaft 33. This casing 41 is provided with a crown wheel 42, driven by a pinion 44 that is attached to a shaft 45 projecting from the casing 25 and to which there is secured a hand wheel 48.

The shaft 45 carries a gear wheel 50 connected by a reducing train of gears 51, 52, 53, 54 and 55 with a shaft 56 operating a propeller pitch indicating device 57.

A stop device, not shown, permits of fixedly holding the shaft 45 in any angular position desired, said device being arranged so that it may be put out of action when desired.

An electric motor 70 rotating in both directions and controlled by a reversing switch 71 may be coupled with the shaft 45 through the medium of a reducing gear (Fig. 4). This motor may be automatically started, for example under control of the speed of propeller shaft 2, through the medium of a centrifugal device or the like.

The operation is as follows:

When the shaft 45 is locked, the sun wheels 30, 31 rotate at the same speed and in opposite directions, so that the set of teeth 23 and the sleeve 21 are driven at the same speed and in the same direction as the shaft 2, relatively to which they are thus unmovable. Hence, as the transmission existing between said sleeve and the shaft 12 of each blade will not effect any movement relatively to shaft 2, the pitch of the blades remains unchanged.

By impressing a turning movement in one or the other direction on the shaft 45, the equality of speed of the planet wheels will be broken and sleeve 20 will receive a turning movement of corresponding value relatively to propeller shaft 2. This turning movement is transmitted, with suitable elevation, to each of the shafts 12 by the driving connection comprising wheel 19, shaft 18 and pinions 17, 16, resulting in an axial movement of each of the nuts 10, these in turn compelling the co-operating blades to alter their angular position by a corresponding angular movement, by means of the rack 9 and the wheel 8, this angular movement being dependent upon the turning movement given to shaft 45. The pitch of the propeller is thus positively controlled by said shaft, the angular position of which is transmitted to the indicator 51, on which said pitch may thus be read at any time.

This invention is, obviously, in nowise limited to the embodiments shown and described above, as these have only been given as examples.

What I claim is:

In a propeller construction, a hub in which a plurality of blades are mounted to rotate individually about their axes, a propeller shaft on which the hub is fixed, individual adjusting means on said hub for each blade, each pitch adjusting means comprising a pinion fixed on the blade root, a screw shaft rotatably extending parallel to the propeller shaft, a nut threaded on the said screw shaft and having a rack on one side thereof meshed with the blade root pinion, means preventing turning of the nut, whereby the rotation of the screw shaft changes the pitch of the blade, gear means positioned at the front of said hub and operatively connected with the forward end of each of the screw shafts, second gear means operatively connected to said first gear means and including at least one driving pinion positioned at the rear of the hub, driving means operatively connected with said gear means for turning the blades, said driving means comprising a sleeve gear axially rotatable on said propeller shaft and meshing with all of said driving pinions, a ring gear fixed on said propeller shaft, a differential comprising a pair of sun wheels one of which is geared to said sleeve gear and the other reverse geared to said ring gear, a differential cage mounted coaxially with the sun wheels and surrounding the sun wheels, a planet pinion mounted on said differential cage and meshing with said sun wheels, and means for rotating said differential cage so as to change the pitch of the propeller blades.

CHARLES RAYMOND WASEIGE.

REFERENCES CITED

The following references are of record in the file of this patent:

UNITED STATES PATENTS

| Number | Name | Date |
|---|---|---|
| 2,127,687 | Heath | Aug. 23, 1938 |
| 2,181,985 | Waseige | Dec. 5, 1939 |
| 2,241,055 | Chilten | May 6, 1941 |
| 2,000,049 | Taylor | May 7, 1935 |
| 2,144,007 | Austin | Jan. 17, 1939 |
| 2,020,366 | MacCallum | Nov. 12, 1935 |
| 2,153,666 | Hill | Apr. 11, 1939 |
| 2,110,272 | Mayer | Mar. 8, 1938 |
| 2,138,339 | Chauviere | Nov. 29, 1938 |
| 1,483,081 | Dean | Feb. 12, 1924 |
| 2,033,342 | Lansing | Mar. 10, 1936 |
| 1,886,278 | Wilson | Nov. 1, 1932 |
| 2,392,556 | Seppeler | Jan. 8, 1946 |

FOREIGN PATENTS

| Number | Country | Date |
|---|---|---|
| 499,223 | Great Britain | Aug. 12, 1936 |
| 763,025 | France | Feb. 5, 1934 |
| 838,617 | France | Dec. 7, 1938 |
| 844,172 | France | Apr. 17, 1939 |
| 141,989 | Great Britain | Apr. 29, 1920 |
| 519,622 | Great Britain | Apr. 2, 1940 |
| 726,918 | France | June 6, 1932 |